United States Patent [19]
Struhsaker

[11] Patent Number: 5,966,411
[45] Date of Patent: Oct. 12, 1999

[54] MULTIPATH EQUALIZATION USING TAPS DERIVED FROM A PARALLEL CORRELATOR

[75] Inventor: Paul F. Struhsaker, Plano, Tex.

[73] Assignee: Alcatel USA Sourcing, L.P., Plano, Tex.

[21] Appl. No.: 08/768,814

[22] Filed: Dec. 18, 1996

[51] Int. Cl.[6] .................................................. H03D 3/22
[52] U.S. Cl. ......................... 375/332; 375/208; 375/280; 375/343; 370/206
[58] Field of Search .................................. 375/206, 208, 375/343, 346, 349, 326, 235, 332, 298, 280; 370/206, 209, 320, 335, 342, 479, 515

[56] References Cited

U.S. PATENT DOCUMENTS

| | | | |
|---|---|---|---|
| 5,237,586 | 8/1993 | Bottomley | 375/1 |
| 5,353,306 | 10/1994 | Yamamoto | 375/14 |
| 5,414,728 | 5/1995 | Zehavi | 375/200 |
| 5,442,627 | 8/1995 | Viterbi et al. | 375/205 |
| 5,691,974 | 11/1997 | Zehavi | 370/209 |
| 5,751,761 | 5/1998 | Gilhousen | 370/209 |
| 5,757,844 | 5/1998 | Fukawa et al. | 375/202 |

FOREIGN PATENT DOCUMENTS 0668662  8/1995  European Pat. Off. ........ H04B 1/707

OTHER PUBLICATIONS

Urs Grob, et al., "Microcellular Direct–Sequence Spread–Spectrum Radio System Using N–Path RAKE Receiver" IEEE Journal on Selected Areas in Communications, vol. 8, No. 5, Jun. 1990, pp. 772–780.

Primary Examiner—Chi H. Pham
Assistant Examiner—Emmanuel Bayard
Attorney, Agent, or Firm—Baker & Botts, L.L.P.

[57] ABSTRACT

A communication system (10) includes a central terminal (12) and a subscriber terminal (14) that communicate information through an air interface (16). A receiver (22) suitable for deployment in either the central terminal (12) or the subscriber terminal (14) includes a parallel correlator (120), a weighting module (140), and a summer (180) that provide acquisition, equalization, and tracking functions.

20 Claims, 3 Drawing Sheets

MULTIPATH EQUALIZATION USING TAPS DERIVED FROM A PARALLEL CORRELATOR

TECHNICAL FIELD OF THE INVENTION

This invention relates in general to communications systems and more particularly to multipath equalization using taps derived from a parallel correlator.

BACKGROUND OF THE INVENTION

A wireless communication system includes a transmitter for encoding or modulating user data for transmission over an air interface to a receiver. In addition to the direct or line-of-sight transmission, the receiver may also detect multipath transmissions caused by reflections from terrain features and man-made objects. For effective communication, the demodulator in the receiver resolves the additive combination of these delayed and attenuated versions of the direct transmission. The degradation of the transmitted signal due to multipath effects may severely limit the performance of a wireless communication system. With increased bandwidth requirements in communications and development of new and more complex modulation techniques, such as quadrature amplitude modulation (QAM), the reduction or elimination of multipath interference becomes more important. Directional antennae placed on the transmitter, receiver, or both may geometrically reduce the number of potential multipath transmissions between the transmitter and the receiver. Also, traditional tapped delay lines or rakes may perform some level of channel equalization to accurately recover the transmitted signal. However, many of these techniques require excess signal to noise levels to resolve multipath interference, which reduces the total available information bandwidth in a wireless communication system.

SUMMARY OF THE INVENTION

In accordance with the present invention, an equalization technique is provided that addresses problems associated with previously developed techniques. In particular, the present invention discloses a technique for multipath equalization using taps derived from a parallel correlator.

In one embodiment of the present invention, a communications system includes a transmitter that generates a transmitted signal. A receiver receives the transmitted signal and includes a code module that generates a number of codes. A number of correlators are coupled to the code modulator and combine the transmitted signal and the codes to generate a number of correlator outputs. Each correlator has an associated code to generate an associated correlator output. A weighting module is coupled to the correlators and multiplies the correlator outputs by a number of weights to generate a number of tap values. Each correlator has an associated weight. A summer is coupled to the weighting module and sums the tap values to generate an estimate.

Technical advantages of the present invention include an equalization technique that incorporates a parallel correlator having a number of correlators arranged in parallel. Specifically, each correlator combines a version of the transmitted signal with a correlation code to produce a correlator output. This correlator output is then multiplied by a weight associated with the correlator to generate a tap value. A summer combines the tap values from the parallel correlator to generate an estimate of the transmitted signal.

Another important technical advantage of the present invention includes the adaptation of the parallel correlator to a spread spectrum communication system that includes a central terminal servicing a number of associated subscriber terminals. Receivers incorporating the equalization techniques of the present invention may reside at the central terminal and subscriber terminals. In a particular embodiment each receiver in such a system includes a number of correlators associated with codes that comprise at least a portion of a multiple access spreading sequence associated with the receiver. Each code reflects a different phase adjustment to the multiple access spreading sequence to provide a tapped delay line configuration. This equalization technique can process in-phase (I) and quadrature (Q) signals in a complex environment to support a variety of modulation techniques, including quadrature amplitude modulation (QAM).

Still another technical advantage of the present invention includes the use of a parallel correlator to perform other functions in the receiver. For example, the parallel correlator may operate in a first mode to acquire the signal, and in a second mode to provide both channel equalization and tracking. In a particular embodiment, the parallel correlator includes many gates to reduce signal acquisition time, and implements traditional early, late, and on-time gates for signal tracking. Other technical advantages of the present invention are apparent to one skilled in the art in view of the attached figures, description, and claims.

BRIEF DESCRIPTION OF THE DRAWINGS

For a more complete understanding of the present invention and advantages thereof, reference is now made to the accompanying description taken in conjunction with the accompanying drawings, in which like reference numbers indicate like features and wherein.

DETAILED DESCRIPTION OF THE INVENTION

Figure 1:
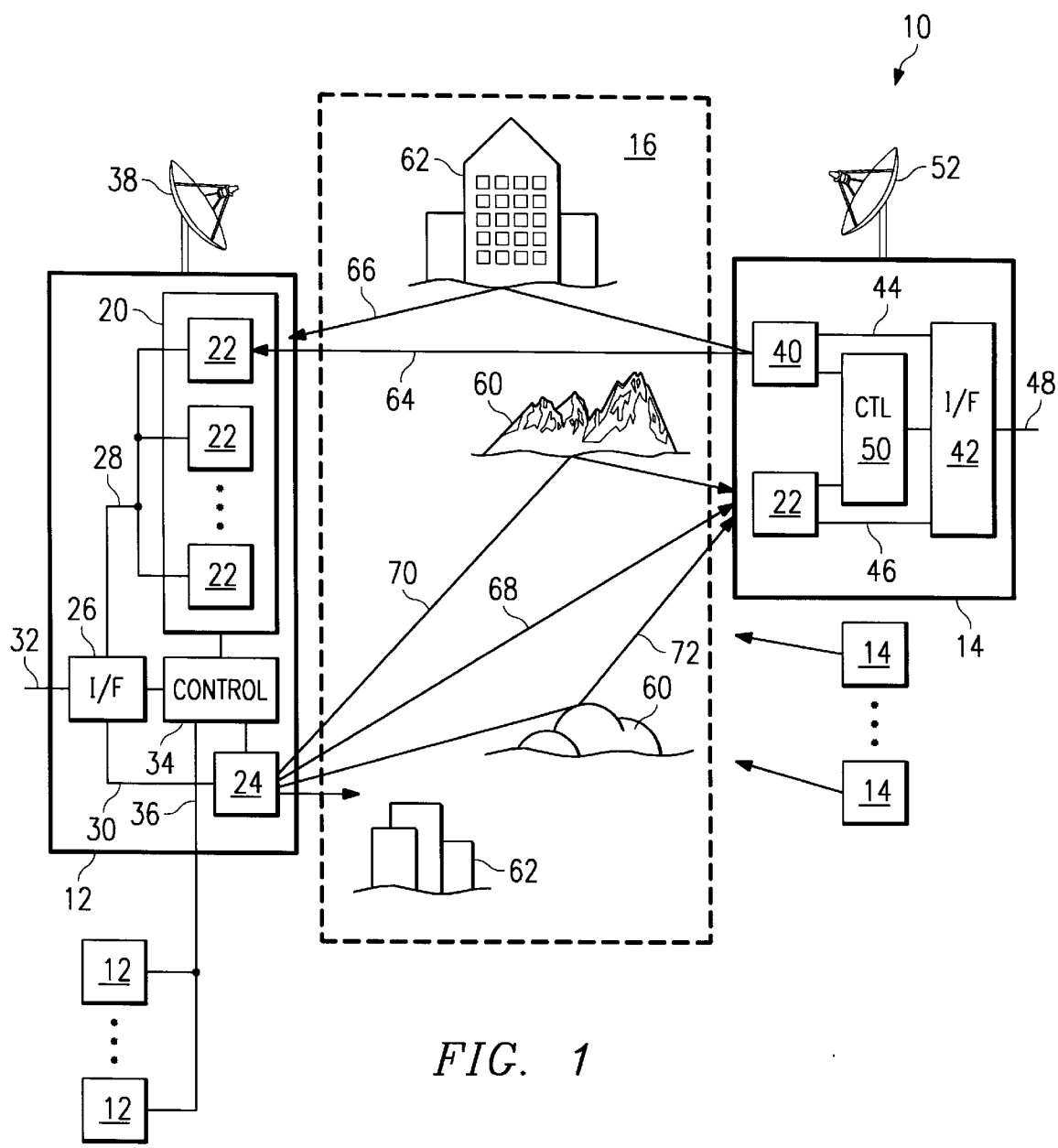
FIG. 1 illustrates a schematic block diagram of a communication system.

FIG. 1 illustrates a wireless communication system 10 that includes a central terminal 12 and a number of subscriber terminals 14 that communicate information over an air interface 16. Generally, central terminal 12 and subscriber terminals 14 include receivers having a parallel correlator that performs channel equalization to reduce the effects of multipath interference introduced by air interface 16.

Central terminal 12 includes a receiver bank 20 having a number of individual receivers 22. Central terminal 12 also includes a transmitter module 24 that transmits signals to subscriber terminals 14. In a particular embodiment, each receiver 22 receives and processes signals from an assigned subscriber terminal 14, whereas transmitter 24 combines and transmits signals destined for many subscriber terminals 14 serviced by central terminal 12. Central terminal 12 may include receivers 22 and transmitter 24 in any number and arrangement of components to accomplish communication with subscriber terminals 14.

An interface 26 couples to receiver bank 20 using receive line 28 and to transmitter 24 using transmit line 30. Interface 26 performs multiplexing or demultiplexing functions, data encoding or decoding functions, protocol conversions, device or network interfacing, or any other appropriate processing to communicate information between receive line 28, transmit line 30, and network line 32. Network line 32 may be any bidirectional communication link that communicates information between central terminal 12 and other components of a communications network, such as the public switched telephone network (PSTN), other switched or dedicated networks, a local area network (LAN), a wide area network (WAN), or any other communication facilities. Communication system 10 supports the transmission of any form of information whether originally in analog or digital form, including voice, video, data, or other form of information.

Control module 34 is coupled to receiver bank 20, transmitter 24, and interface 26. Control module 34 includes one or more processors or computers that execute program instructions to manage the overall operation of central terminal 12. Control module 34 may include a link 36 to other central terminals 12 to provide control, management, diagnostic, and troubleshooting functions to a network of central terminals 12 included in communication system 10.

Each subscriber terminal 14 in communication system 10 includes a receiver 22, similar in design and function as receivers 22 in receive bank 20 of central terminal 12. A transmitter 40 provides similar encoding, modulation, and transmission capabilities as transmitter 24 in central terminal 12, but transmits signals associated with subscriber terminal 14. An interface 42 performs multiplexing and demultiplexing functions, data encoding or decoding functions, protocol conversions, device or network interfacing, or any other appropriate processing to communicate information between transmit line 44, receive line 46, and subscriber line 48. Subscriber line 48 is a bidirectional communication link between subscriber terminal 14 and equipment at the subscriber premises, such as a telephone handset, computer, or other form of communications equipment. A control module 50 is coupled to receiver 22, transmitter 40, and interface 42 and includes one or more processors or computers that execute program instructions to manage the overall operation of subscriber terminal 14.

Air interface 16 between central terminal 12 and its associated subscriber terminals 14 may include a number of natural features 60 and man-made objects 62 that cause multipath transmission of signals. For example, a transmitted signal from subscriber terminal 14 to an associated receiver 22 at central terminal 12 may include a direct or line-of-sight transmission 64 as well as a multipath transmission 66 that reflects off of man-made object 62. Similarly, a transmitted signal transmitted from central terminal 12 to subscriber terminal 14 may include a direct transmission 68, as well as multipath transmissions 70 and 72 caused by reflection off of natural features 60. Generally, a transmitted signal passing through air interface 16 includes a direct transmission, a multipath transmission, or any combination of a direct transmission and one or more multipath transmissions.

Receivers 22 at central terminal 12 and subscriber terminals 14 include an equalization function described below with reference to FIGS. 2–4 that reduces or eliminates the effect of multipath transmissions, thereby increasing the capacity, reliability, and performance of communication system 10. In a particular embodiment, antenna 38 of central terminal 12 and antenna 52 of subscriber terminal 14 are directional to define a maximum cone or geometric spread of transmission or reception that can further reduce the potential multipath transmissions in air interface 16.

In operation, central terminal 12 receives information to transmit to subscriber terminal 14 using network line 32. Interface 26 processes information received on network line 32 to place on transmit line 30 for delivery to transmitter 24. Transmitter 24 receives information destined for a number of subscriber terminals 14 and combines, encodes, modulates, mixes, and/or amplifies this information to generate a single composite signal for transmission using antenna 38. In a particular embodiment, the transmitted signal that includes information for subscriber terminals 14 serviced by central terminal 12 arrives at subscriber terminal 14 along direct transmission 68 as well as multipath transmissions 70 and 72. Receiver 22 performs an equalization function to reduce or eliminate the effects of multipath transmissions 70 and 72 and retrieves user data in the transmitted signal associated with subscriber terminal 14. Receiver 22 then passes user data to subscriber line 48 using receive line 46 and interface 42.

Similarly, subscriber terminal 14 receives information to transmit to central terminal 12 using subscriber line 48. Interface 42 processes the information, if appropriate, and passes it to transmitter 40 using transmit line 44. Transmitter 40 encodes, modulates, mixes, and/or amplifies the signal for transmission using antenna 52. The transmitted signal arrives at receiver 22 in central terminal 12 associated with subscriber terminal 14 as a direct transmission 64 and multipath transmission 66. Receiver 22 performs an equalization function to reduce or eliminate the effects of multipath transmission 66 and passes user data to network line 32 using receive line 28 and interface 26.

In a particular embodiment of the present invention, communication system 10 communicates information in air interface 16 using code division multiple access (CDMA) technology. Each subscriber terminal 14 maintains a distinct code that allows central terminal 12 to communicate simultaneously with a number of subscriber terminals 14. The codes may include one or a combination of Walsh codes, Gold codes, pseudorandom noise (PN) codes, or other suitable sequences. The codes may also comprise or be combined with suitable spreading sequences, as well.

Central terminal 12 transmits a composite signal that includes a number of different information signals, each information signal coded for a different subscriber terminal 14. Each subscriber terminal 14 receives the composite signal and extracts its associated information signal by combining its distinct code with the composite signal. Subscriber terminals 14 can simultaneously transmit to produce a composite signal at antenna 38 of central terminal 12. Each receiver 22 in receiver bank 20 has a distinct code used by its associated subscriber terminal 14, and uses this code to extract information for communication to network line 32 using receive line 28 and interface 26.

Figure 2:
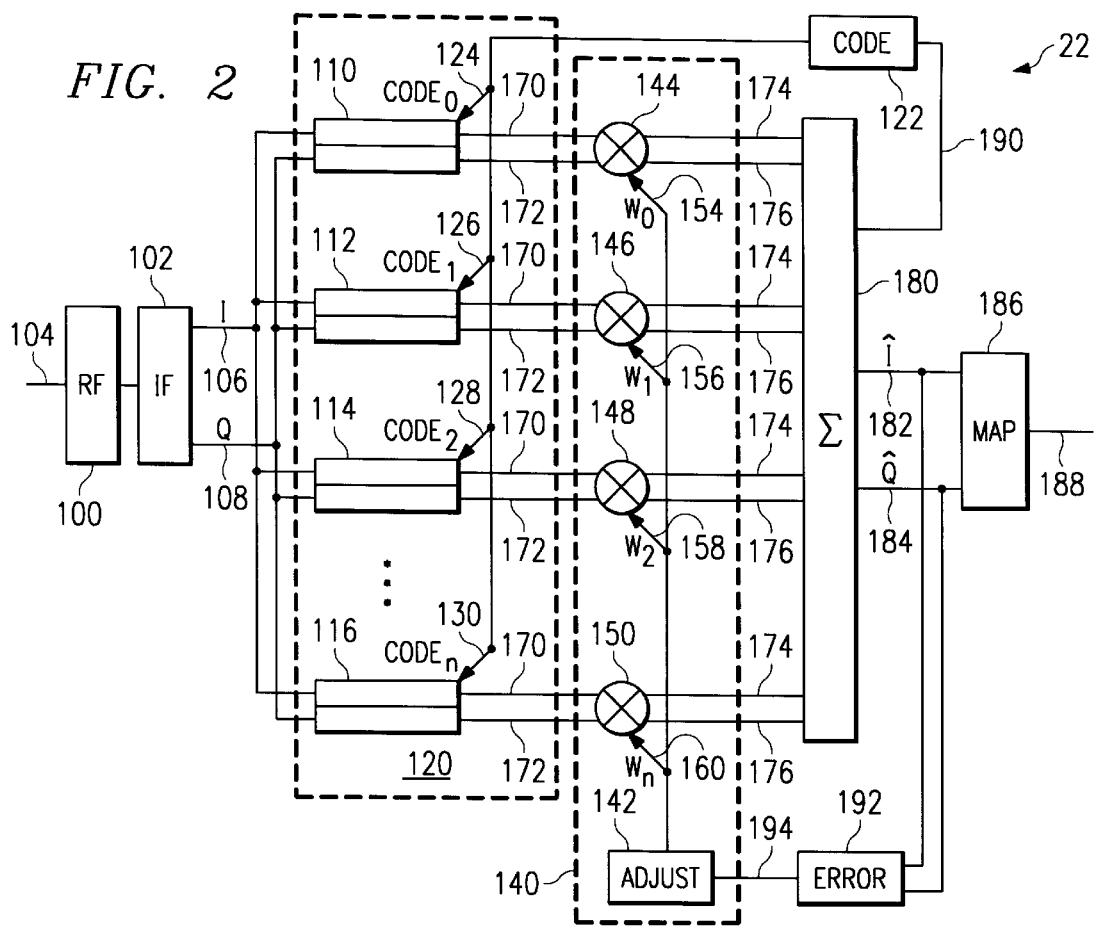
FIG. 2 illustrates a schematic block diagram of a receiver used in the communication system.

FIG. 2 illustrates a block diagram of receiver 22 used in central terminal 12 and subscriber terminals 14. Receiver 22 in central terminal 12 may differ in design or component structure from receiver 22 in subscriber terminal 14 due to cost, sizing, programmability, reliability, or other considerations. However, receiver 22 described below provides the functions and overall architecture applicable to either embodiment in central terminal 12 and subscriber terminal 14.

Receiver 22 includes a radio frequency (RF) module 100 and an intermediate frequency (IF) module 102 that transforms transmitted signal 104 into in-phase (I) 106 and quadrature (Q) 108 baseband components. Receiver 22 applies these components 106 and 108 to a correlator bank 120, a weighting module 140, and a summer 180 to produce estimates 182 (I) and 184 (Q) of transmitted signal 104. Receiver 22 also includes a code module 122, an error estimator 192, and a mapper 186 to transform estimates 182 and 184 into user data 188.

Baseband I 106 and baseband Q 108 are applied to a number of individual correlators 110, 112, 114, and 116 (generally referred to as correlators 110) in parallel correlator 120. Code module 122 is coupled to parallel correlator 120, and provides different codes 124, 126, 128, and 130 (referred to generally as codes 124) to respective correlators 110. In a particular embodiment, codes 124 comprise at least a portion of a multiple access sequence associated with receiver 22, and each code 124 reflects a different phase adjustment to the multiple access sequence. For example, code 124 may be shifted by a bit, chip, fraction of a bit or chip, or other suitable amount from code 126. Likewise, code 126 is shifted in relation to code 128, and code 128 is shifted in relation to code 130.

Described in more detail with reference to FIG. 3, parallel correlator 120 performs a phase adjusted correlation of baseband I 106 and baseband Q 108. This correlation may be done using an appropriate technique, such as an integrate and dump, to produce a measure of the correlation between transmitted signal 104 and an associated code 124. In a particular embodiment, the correlation performed by parallel correlator 120 may be done on a symbol-by-symbol basis, where codes 124 may be the full length or a portion of the length of the symbol processed by receiver 22.

An important technical advantage of the present invention is the use of parallel correlator 120 in a tapped delay line configuration. This configuration includes weighting module 140 having an adjust module 142 and multipliers 144, 146, 148, and 150 (referred to generally as multipliers 144) to apply weights 154, 156, 158, and 160 (referred to generally as weights 154) to outputs of correlators 110. In a particular embodiment, multipliers 144 and weights 154 operate with complex values.

Correlator 110 using code 124 generates an I correlator output 170 and a Q correlator output 172. Correlator outputs 170 and 172 are multiplied by complex weight 154 using complex multiplier 144 to generate an I tap value 174 and a Q tap value 176. This correlation and weighting function is performed for all correlators 110 in parallel correlator 120 to produce tap values 174 and 176 for presentation to summer 180.

Summer 180 sums all tap values 174 and 176 to produce an I estimate 182 and a Q estimate 184 for presentation to a mapper 186. Estimates 182 and 184 represent an information signal extracted from transmitted signal 104 using a multiple access sequence associated with receiver 22 and equalized by the tapped delay line configuration of parallel correlator 120, weighting module 140, and summer 180.

Mapper 186 applies estimates 182 and 184 to a mapping function to generate user data 188. For example, a mapping function may comprise a quadrature amplitude modulation (QAM) constellation that translates the phase and magnitude of a received signal into a series of bits. Mapper 186 may employ any suitable frequency shift keying (FSK), phase shift keying (PSK), QAM or any combination of these modulation techniques to translate estimates 182 and 184 into user data 188. Moreover, mapper 186 may operate on estimates 182 and 184 directly as in-phase and quadrature components or translate estimates 182 and 184 into a phase and magnitude representation. User data 188 output from mapper 186 may be further processed using forward error correction (FEC) techniques, protocol conversions, or other digital bit stream processing technique.

Parallel correlator 120 may operate in a first mode to acquire transmitted signal 104, and in a second mode to provide both channel equalization and tracking in receiver 22. In a particular embodiment, parallel correlator 120 uses many correlators 110 to reduce signal acquisition time, and at least a portion of correlators 110 to implement traditional early, late, and on-time signal tracking. Summer 180 generates a tracking signal 190 to identify one or more correlators 110 most closely aligned with transmitted signal 104. The absence or reduced value of tracking signal 190 may indicate that receiver 22 has not acquired transmitted signal 104. In response to tracking signal 190, code module 122 may adjust phases of codes 124 provided to correlators 110 to track and center transmitted signal 104. Since parallel correlator 120 already includes numerous correlators 110, receiver 22 also provides quicker, parallel acquisition capabilities using the same components that provide the tracking and equalization function. Upon acquiring a signal as indicated by large correlator outputs 170 and 172, track signal 190 identifies the on-time or tracking correlator 110 to provide additional fine tuning in tracking and centering. Receiver 22 contemplates a variety of acquisition, equalization, and tracking functions performed simultaneously or in sequence by parallel correlator 120.

Receiver 22 may also include an error estimator 192 that generates an error 194 representing the estimated error of estimates 182 and 184 produced by summer 180. Adjust module 142 in weighting module 140 uses error 194 to adjust weights 154. In a particular example, receiver 22 initializes weights for an ideal or known channel response, and then adjusts the weights as needed using error estimator 192 and adjust module 142. The adjustment of weights 154 may be performed using any appropriate technique or algorithm, including but not limited to least mean squares (LMS), recursive least squares (RLS), or property restoral algorithms such as constant modulus or average modulus.

Figure 3:
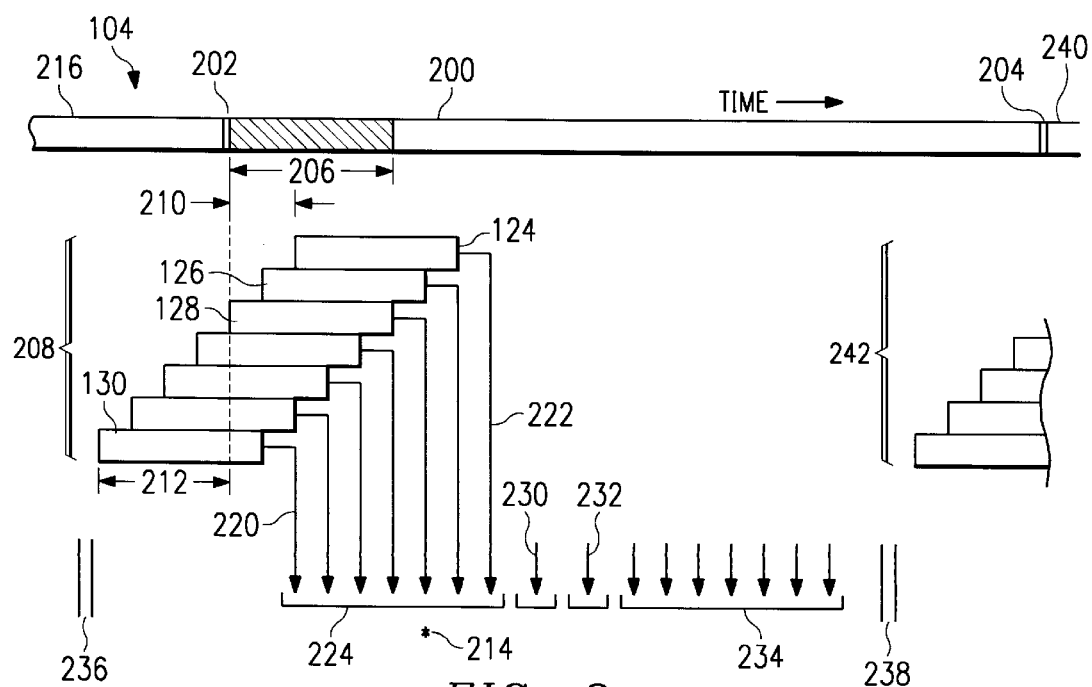
FIG. 3 illustrates a particular embodiment of the processing sequence of the receiver.

FIG. 3 illustrates the processing sequence over time of receiver 22. The sequence illustrates a symbol 200 received in transmitted signal 104. Symbol 200 may comprise any arrangement or sequence of digital information presented to parallel correlator 120 in one or more components. Symbol 200 includes a start point 202 and a stop point 204. A code length 206 represents the full or partial length of symbol 200. Each correlator 110 uses its associated code 124 of length 206 to correlate transmitted signal 104.

Phase-adjusted code sequences 208 directly below symbol 200 represent the different correlators 110 and associated codes 124 in parallel correlator 120. For example, correlator 110 uses code 124 having a delay time 210 with respect to start time 202 of symbol 200. Likewise, correlator 116 uses code 130 having an advance time 212 with respect to start time 202 of symbol 200. In this example, correlator 114 using code 128 has a zero or near-zero phase adjustment with respect to start time 202, and represents the on-time or tracking correlator as represented by star 214. Parallel correlator 120 may include any number of correlators, preferably having a variety of delay times 210 and advance times 212 with reference to start time 202 of symbol 200.

Towards the end of a prior symbol 216 in transmitted signal 104, the most advanced correlator 116 begins to process transmitted signal 104. After correlating over code length 206, correlator 116 provides a correlator output as indicated by arrow 220 which may include I correlator output 170 and Q correlator output 172. Other correlators 110 process transmitted signal 104 in a similar manner, but at a different time depending upon their associated phase adjustment. Finally, the last processing correlator 110 provides its correlator outputs 170 and 172, as indicated by arrow 222, to complete a full set of outputs 224.

Next, weighting function 140 and summer 180 produce estimates 182 and 184, as represented by arrow 230. If appropriate, error estimator 192 also produces error 194 as represented by arrow 232. To conclude the symbol processing sequence, adjust module 142 adjusts weights 154 in response to error 194, as represented by arrows 234. Processing of symbol 200 by receiver 22 occurs between process start time 236 and process end time 238. The processing of a next symbol 240 begins after process stop time 238 as indicated by the next round of phase-adjusted code sequences 242.

Figure 4:
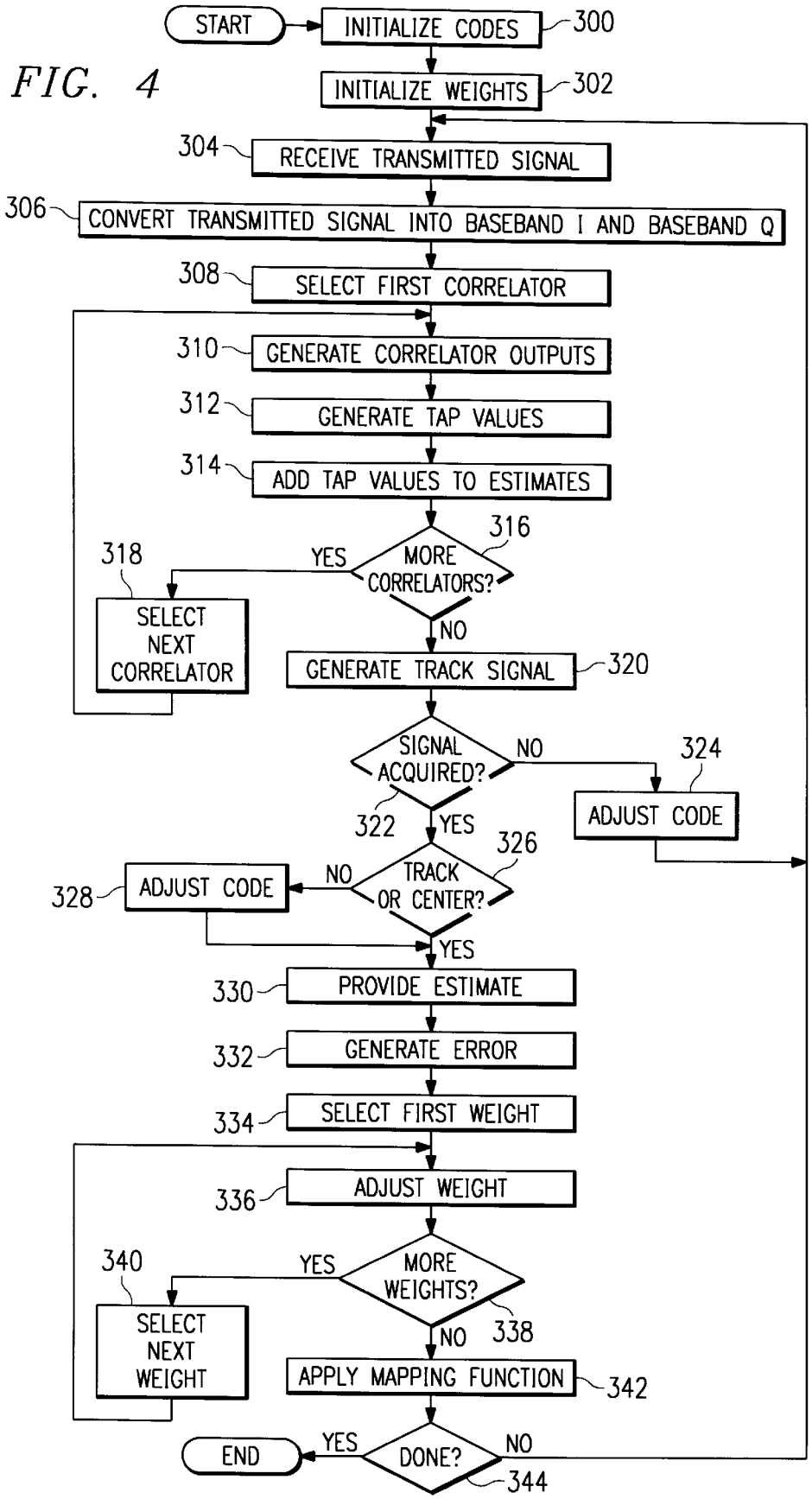
FIG. 4 illustrates a flow chart of a method of operation of the receiver.

FIG. 4 illustrates a flow chart of a method of operation of receiver 22 in communication system 10. The method begins at step 300 and 302 where receiver 22 initializes codes 124 maintained in code module 122 and weights 154 maintained in weighting module 140, respectively. Receiver 22 next receives a portion of transmitted signal 104 such as symbol 200 at step 304, and converts transmitted signal 104 into baseband I 106 and baseband Q 108 at step 306 using RF module 100 and IF module 102.

Receiver 22 next generates correlator outputs 170 and 172 at steps 308 to 318. Receiver 22 selects first correlator 110 at step 308, and generates correlator outputs 170 and 172 at step 310. In one embodiment, correlator 110 uses code 124 to perform an integrate and dump function on a portion of symbol 200. Receiver 22 then generates tap values 174 and 176 using weighting module 140 at step 312. For example, weighting module 140 may multiply correlator outputs 170 and 172 by weight 154 using complex multiplier 144. Summer 180 adds tap values 174 and 176 generated by weighting module 140 to the current value of estimates 182 and 184 at step 314. If there are more correlators 110 to process transmitted signal 104 at step 316, then the process selects the next correlator at step 318 and repeats steps 310 through 314 for each additional correlator 110 in parallel correlator 120.

If appropriate, summer 180 generates track signal 190 in response to tap values 174 and 176 received from correlators 110 at step 320. If track signal 190 indicates that receiver 22 has not acquired transmitted signal 104 at step 322, then code module 122 adjusts codes at step 324 and continues to step 304 to receive the next transmitted signal 104 or the next symbol 240 at step 304. If receiver 22 has acquired transmitted signal 104 at step 322 but not properly tracked or centered transmitted signal 104 in parallel correlator 120 at step 326, then code module 122 may make further adjustments to codes 124 at step 328. Steps 320 to 328 contemplate any suitable acquisition, tracking, or centering operation using parallel correlator 120.

Summer 180 provides the final value of estimates 182 and 184 at step 330. Using estimates 182 and 184, error estimator 192 generates error 194 at step 332. Adjust module 142 selects the first weight 154 to adjust at step 334, and adjusts weight 154 in response to error 194 at step 336. The adjustment of weights 154 at step 336 may be performed using any appropriate technique or algorithm, including but not limited to least mean squares (LMS), recursive least squares (RLS), or property restoral algorithms such as constant modulus or average modulus. If receiver 22 needs to adjust more weights 154 at step 338, then the next weight is adjusted at step 340, and the process repeated.

Before, after, or simultaneous with the adjustment of weights in steps 334 to 340, mapper 186 applies a mapping function to estimates 182 and 184 at step 342. This mapping function may translate I and Q components of estimates 182 and 184 into user data 188, with or without an intermediate translation into phase and magnitude. If receiver 22 is not done processing transmitted signal 104 at step 344, the process continues to receive the next symbol 240 or transmitted signal 104 at step 304.

Although the present invention has been described with several embodiments, a myriad of changes, variations, alterations, transformations, and modifications may be suggested that one skilled in the art, and it is intended that the present invention encompass such changes, variations, alterations, transformations, and modifications as fall within the spirit and scope of the appended claims.

What is claimed is:

1. A communications system, comprising:
    a transmitter operable to generate a transmitted signal; and
    a receiver operable to receive the transmitted signal, the receiver comprising:
        an input module operable to convert the transmitted signal into in-phase and quadrature-phase components;
        a code module operable to generate a plurality of codes;
        a plurality of correlators coupled to the code module, each of the plurality of correlators operable to correlate each of the in-phase and quadrature-phase components of the transmitted signal and an associated one of the plurality of codes to generate associated in-phase and quadrature-phase correlator outputs, each of the associated in-phase and quadrature-phase correlator outputs indicating a measure of the correlation between its respective in-phase and quadrature-phase components and their associated one of the plurality of codes;
        a plurality of multipliers coupled to each correlator, each multiplier operable to receive its associated in-phase and quadrature-phase correlator outputs;
        a weighting module coupled to the plurality of multipliers, each multiplier operable to multiply each of the associated in-phase and quadrature-phase correlator outputs by an associated one of a plurality of weights to generate a plurality of in-phase and quadrature-phase tap values; and
        a summer coupled to each multiplier, the summer operable to sum the in-phase and quadrature-phase tap values to generate an in-phase and a quadrature-phase estimate.

2. The system of claim 1, wherein the receiver further comprises a mapper coupled to the summer, the mapper operable to apply a mapping function to the estimate to generate user data.

3. The system of claim 1, further comprising an error estimator operable to generate an error in response to the estimate, the weighting module further operable to adjust the weights in response to the error generated by the error estimator.

4. The system of claim 1, wherein the codes comprise at least a portion of a multiple access sequence associated with the receiver, each code reflecting a different phase adjustment to the multiple access sequence.

5. The system of claim 1, wherein:
    each correlator output comprises an in-phase and quadrature component; and
    the weighting module performs a complex multiply.

6. The system of claim 1, wherein the code module is further operable to adjust the codes in response to a track signal received from the summer.

7. A receiver operable to process a transmitted signal, the receiver comprising:

an input module operable to convert the transmitted signal into in-phase and quadrature-phase components;

a code module operable to generate a plurality of codes;

a plurality of correlators coupled to the code module, each of the plurality of correlators operable to correlate each of the in-phase and quadrature-phase components of the transmitted signal and an associated one of the plurality of codes to generate associated in-phase and quadrature-phase correlator outputs, each of the associated in-phase and quadrature-phase correlator outputs indicating a measure of the correlation between its respective in-phase and quadrature-phase components and their associated one of the plurality of codes;

a plurality of multipliers coupled to each of the plurality of correlators, each multiplier operable to receive its associated in-phase and quadrature-phase correlator outputs;

a weighting module coupled to the plurality of multipliers, each multiplier operable to multiply each of its associated in-phase and quadrature-phase correlator outputs by an associated one of a plurality of weights to generate a plurality of in-phase and quadrature-phase tap values; and a summer coupled to each multiplier, the summer operable to sum the plurality of in-phase and quadrature-phase tap values to generate an in-phase and a quadrature-phase estimate.

8. The receiver of claim 7, wherein the transmitted signal comprises a plurality of symbols processed in sequence by the receiver, each symbol corresponding to a data state in a quadrature amplitude modulation scheme.

9. The receiver of claim 7, further comprising a mapper coupled to the summer, the mapper operable to apply a mapping function to the estimate to generate user data.

10. The receiver of claim 7, further comprising an error estimator operable to generate an error in response to the estimate, the weighting module further operable to adjust the weights in response to the error generated by the error estimator.

11. The receiver of claim 7, wherein the codes comprise at least a portion of a multiple access sequence associated with the receiver, each code reflecting a different phase adjustment to the multiple access sequence.

12. The receiver of claim 7, wherein:

each correlator output comprises an in-phase and quadrature component; and the weighting module performs a complex multiply.

13. The receiver of claim 7, wherein the code module is further operable to adjust the codes in response to a track signal received from the summer.

14. A method for processing a transmitted signal having a symbol, the method comprising:

converting the transmitted signal into in-phase and quadrature-phase components;

combining, using a plurality of correlators, at least a portion of the symbol of each of the in-phase and quadrature-phase components and an associated one of a plurality of codes to generate a plurality of in-phase and quadrature-phase correlator outputs, each of the plurality of in-phase and quadrature-phase correlator outputs indicating a measure of the correlation between its respective in-phase and quadrature-phase components and their associated one of the plurality of codes;

using a plurality of multipliers, each of the plurality of in-phase and quadrature-phase correlator outputs by an associated one of a plurality of weights to generate a plurality of in-phase and quadrature-phase tap values; and summing the plurality of in-phase and quadrature-phase tap values to generate an in-phase and quadrature-phase estimate.

15. The method of claim 14, applying a mapping function to the estimate to generate user data.

16. The method of claim 14, wherein the transmitted signal comprises the symbol and a next symbol received in sequence, and further comprising the following steps performed before processing the next symbol:

generating an error in response to the estimate; and adjusting the weights in response to the error.

17. The method of claim 14, wherein the codes comprise at least a portion of a multiple access sequence associated with the receiver, each code reflecting a different phase adjustment to the multiple access sequence.

18. The method of claim 14, further comprising the step of transmitting the transmitted signal using quadrature amplitude modulation.

19. The method of claim 14, wherein:

each correlator output comprises an in-phase and quadrature component; and the weighting module performs a complex multiply.

20. The method of claim 14, further comprising:

generating a track signal in response to the tap values; and adjusting the codes in response to the track signal.

* * * * *